(12) United States Patent
Wason et al.

(10) Patent No.: US 11,590,668 B2
(45) Date of Patent: Feb. 28, 2023

(54) PORTABLE IN-LINE HYDRAULIC TOOL

(71) Applicant: Hubbell Incorporated, Shelton, CT (US)

(72) Inventors: Peter Matthew Wason, Manchester, NH (US); John David Lefavour, Litchfield, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 17/154,941

(22) Filed: Jan. 21, 2021

(65) Prior Publication Data
US 2021/0138671 A1 May 13, 2021

Related U.S. Application Data

(63) Continuation of application No. 15/979,709, filed on May 15, 2018, now Pat. No. 10,899,027.

(60) Provisional application No. 62/506,441, filed on May 15, 2017.

(51) Int. Cl.
*B26B 15/00* (2006.01)
*B25F 5/02* (2006.01)
*B25F 5/00* (2006.01)
*B25B 28/00* (2006.01)

(52) U.S. Cl.
CPC .............. *B26B 15/00* (2013.01); *B25F 5/005* (2013.01); *B25F 5/02* (2013.01); *B25B 28/00* (2013.01)

(58) Field of Classification Search
CPC ......... B26B 15/00; B26B 28/00; B25F 5/005; B25F 5/02
See application file for complete search history.

(56) References Cited

U.S. PATENT DOCUMENTS

| | | |
|---|---|---|
| 5,289,712 A | 3/1994 | Haughian |
| 7,216,523 B2 | 5/2007 | Frenken |
| 7,290,431 B1 | 11/2007 | Spivak |
| 7,409,846 B2 | 8/2008 | Frenken |
| 7,464,578 B2 | 12/2008 | Ayer |

(Continued)

OTHER PUBLICATIONS

International Search Report and Written Opinion mailed in corresponding PCT Application PCT/US18/32642 dated Aug. 13, 2018 (10 pages).

(Continued)

*Primary Examiner* — Omar Flores Sanchez
(74) *Attorney, Agent, or Firm* — Wissing Miller LLP

(57) ABSTRACT

A portable, hand held hydraulic cutting tool having an in-line handle assembly and a working head assembly. The handle assembly has a tool frame portion and a neck portion. The working head assembly has a pair of jaw members joined so that they are movable relative to each other and held in place by a locking pin. Each jaw member has a cutting blade attached thereto. Each jaw member can be tapered and can include weight reducing pockets defined in respective sidewalls. Each jaw member includes a raised tab on an outside edge that mates with a respective tab notch in a yoke of the neck portion of the handle assembly. When the locking pin is in an extended position, the jaw members of the tool can separate and rotate away from one another until their respective locking tabs engage their respective locking tab opening, connecting the jaw members to the yoke of the neck portion of the handle assembly.

19 Claims, 15 Drawing Sheets

(56) References Cited

U.S. PATENT DOCUMENTS

| | | | |
|---|---|---|---|
| 7,665,343 B2 | 2/2010 | Ballas | |
| 8,336,362 B2 | 12/2012 | Frenken | |
| 8,813,370 B2 | 8/2014 | Pellenc | |
| 9,484,700 B2 | 11/2016 | Kehoe | |
| 10,084,277 B2 | 9/2018 | Wason | |
| 10,899,027 B2 * | 1/2021 | Wason | B25F 5/005 |
| 2006/0000072 A1 | 1/2006 | Frenken | |
| 2006/0272381 A1 | 12/2006 | Ayer et al. | |
| 2007/0256554 A1 | 11/2007 | Montminy et al. | |
| 2008/0072436 A1 | 3/2008 | Frenken | |
| 2008/0087064 A1 | 4/2008 | Lefavour et al. | |
| 2009/0031779 A1 | 2/2009 | Lefavour et al. | |
| 2010/0107843 A1 | 5/2010 | Lefavour et al. | |
| 2011/0113851 A1 | 5/2011 | Frenken | |
| 2015/0283693 A1 | 10/2015 | Chiasson | |
| 2016/0039017 A1 | 2/2016 | Lawlor | |
| 2016/0252112 A1 | 9/2016 | Kehoe | |
| 2017/0317461 A1 | 11/2017 | Wason | |
| 2018/0272445 A1 | 9/2018 | Perkins | |
| 2020/0006907 A1 | 1/2020 | Torrey | |
| 2020/0021088 A1 | 1/2020 | Ballard | |

OTHER PUBLICATIONS

PCT/US2017/030583 International Search Report and Written Opinion dated Sep. 14, 2017 (16 pages).
Supplementary European Search Report mailed in corresponding application EP 18803098 dated Apr. 23, 2021 (9 pages).

* cited by examiner

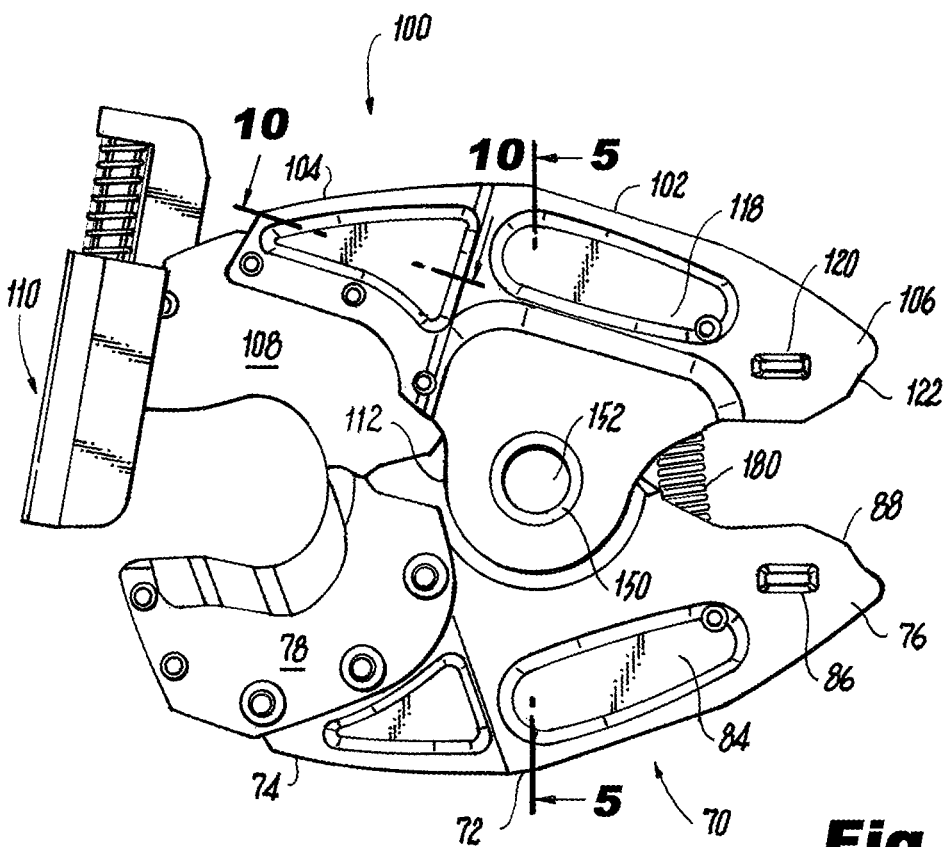
Fig. 4
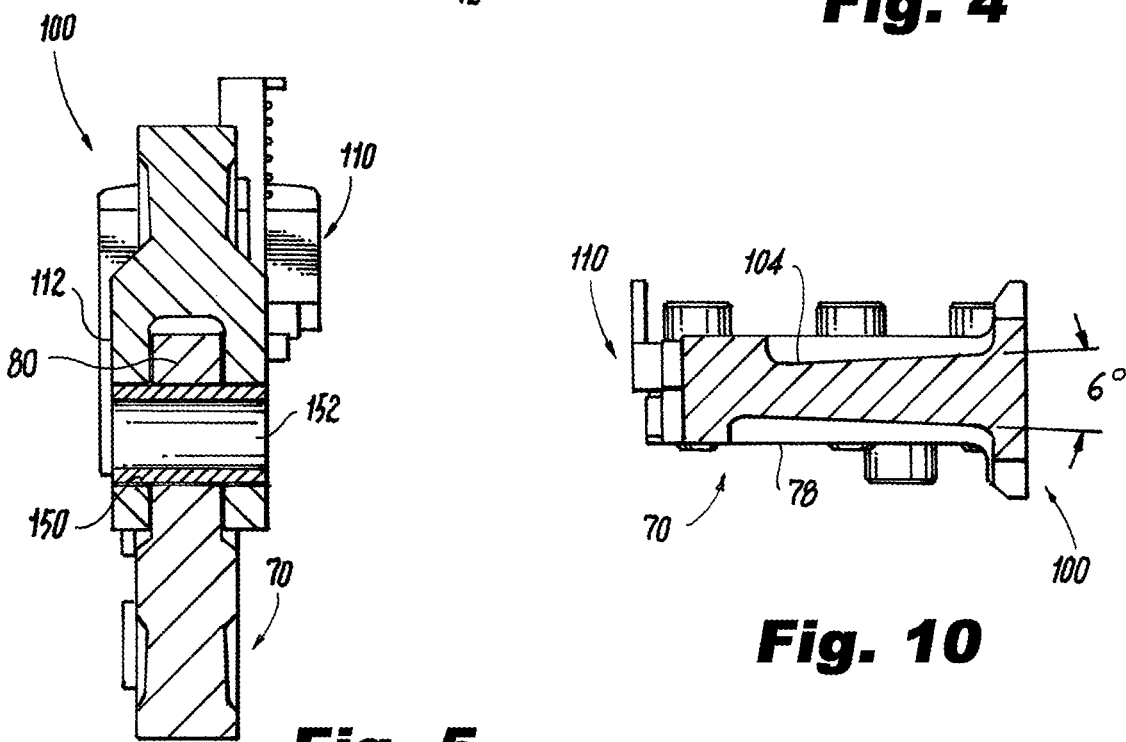
Fig. 5
Fig. 10

Fig. 13
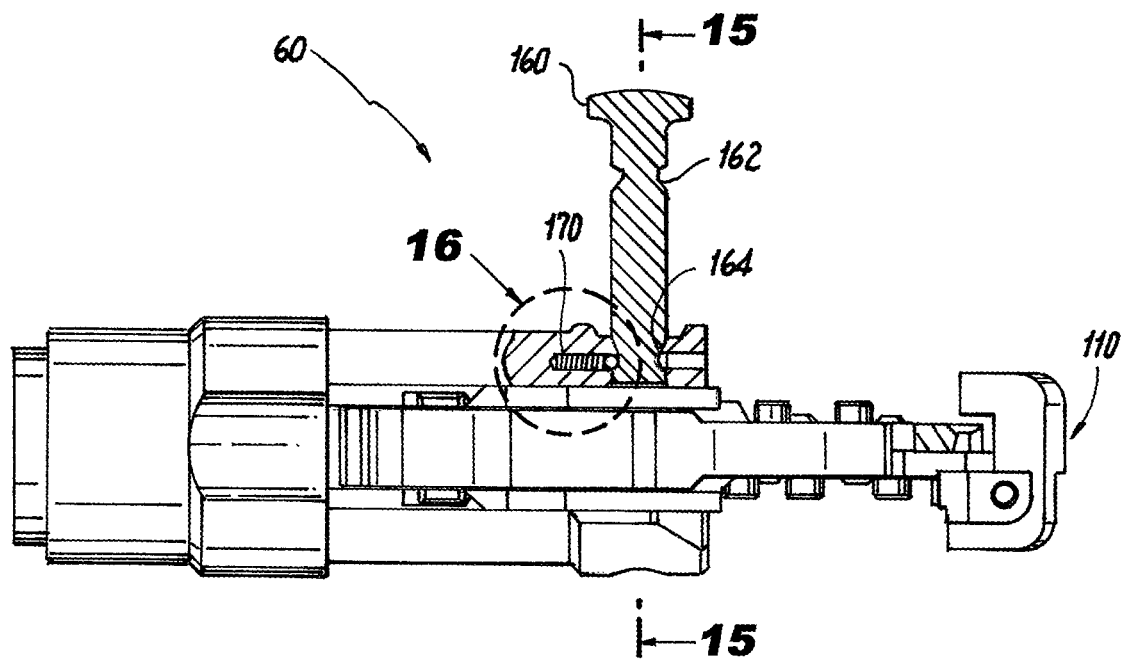
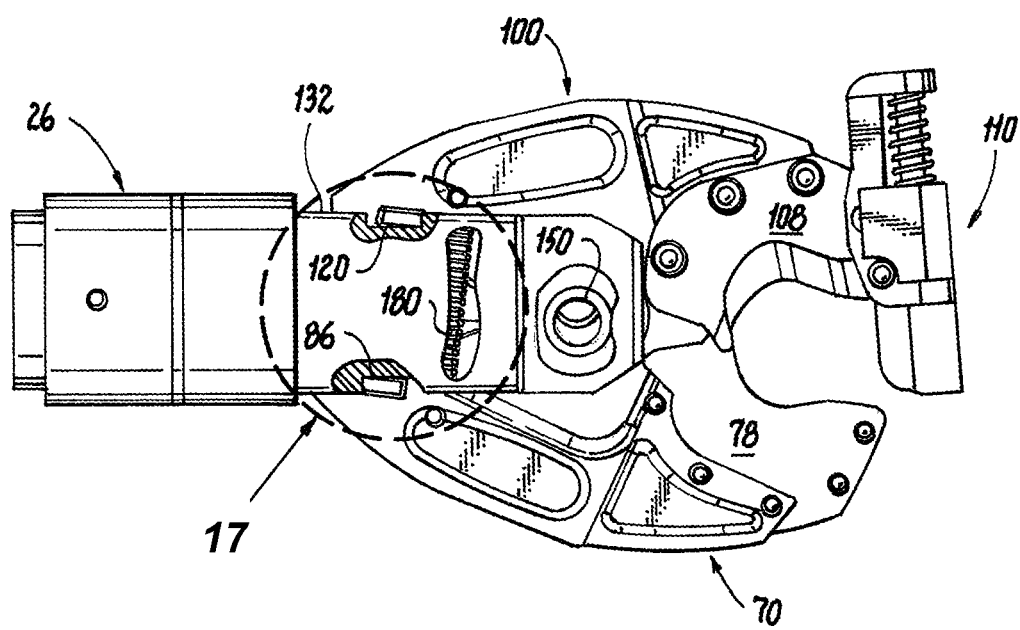
Fig. 14

Position 0°

Position 90°

PORTABLE IN-LINE HYDRAULIC TOOL

CROSS REFERENCE TO RELATED APPLICATIONS

This application is a continuation of co-pending application Ser. No. 15/979,709, filed May 15, 2018, which claims priority to U.S. Provisional Application Ser. No. 62/506,441 filed May 15, 2017 both of which are incorporated herein by reference in their entirety.

BACKGROUND

Field

The present disclosure relates to cooperating jaws and hydraulic tools having cooperating jaws. More particularly, the present disclosure relates to hydraulic, hand-held cutting tools and jaw heads for such cutting tools.

Description of the Related Art

Hand-held hydraulic tools are well known in the art. These tools use cooperating jaws that are hydraulically pressed together with great force to cut materials such as electrical conductors. These tools may be battery-powered to allow mobility and portability for the user. These tools typically employ a locking pin that holds the jaws together for the cutting operation. The locking pin is removed to release the jaws.

SUMMARY

The various advantages aspects and features of the various embodiments of the present disclosure and claimed herein should become evident to a person of ordinary skill in the art given the following enabling description and drawings. The aspects and features disclosed herein are believed to be novel and other elements characteristic of the various embodiments of the present disclosure are set forth with particularity in the appended claims.

In one exemplary embodiment, the present disclosure includes a jaw assembly for an in-line hydraulic cutting tool. The jaw assembly includes a first jaw member, a second jaw member, an interlocking mechanism, a locking pin and a spring member. The first jaw member includes a distal end portion and a proximal end portion. The distal end portion of the first jaw member defines a first portion of a working area of the in-line hydraulic cutting tool and includes a first cutting blade releasably attached thereto. The proximal end portion of the first jaw member includes at least one raised tab used to facilitate connecting the first jaw member to a yoke of the in-line hydraulic cutting tool. The second jaw member includes a distal end portion and a proximal end portion. The distal end portion of the second jaw member defines a second portion of the working area of the in-line hydraulic cutting tool and includes a second cutting blade releasably attached thereto. The proximal end portion of the second jaw member includes at least one raised tab used to facilitate connecting the second jaw member to the yoke of the in-line hydraulic cutting tool. The interlocking mechanism is associated with the first and second jaw members such that the first jaw member and the second jaw member can pivot relative to each other. The locking pin extends through the interlocking mechanism to facilitate releasably attaching the first jaw member and the second jaw member to the yoke of the in-line hydraulic cutting tool when installed. The spring member includes a first end attached to the proximal end portion of the first jaw member and a second end attached to the proximal end portion of the second jaw member. The spring member normally biasing the proximal end portion of the first jaw member and the proximal end portion of the second jaw member toward each other such that the first and second cutting blades are in an open position.

In another exemplary embodiment, the present disclosure includes a jaw assembly for an in-line hydraulic tool. In this exemplary embodiment, the jaw assembly includes a first jaw member, a second jaw member, a sleeve, a locking pin and a spring member. The first jaw member includes a distal end portion, a proximal end portion and a tang positioned between the distal end portion and the proximal end portion. The distal end portion of the first jaw member defines a portion of a working area of the tool and includes a first cutting blade releasably attached thereto. The tang includes a bore therethrough. The second jaw member includes a distal end portion, a proximal end portion and a clevis positioned between the distal end portion and the proximal end portion. The distal end portion of the second jaw member defines another portion of the working area of the tool and includes a second cutting blade releasably attached thereto. The clevis includes a bore therethrough and is capable of receiving the tang of the first jaw member such that the bore through the clevis can align with the bore in the tang. The sleeve is inserted through the tang and clevis bores such that the first jaw member and second jaw member can pivot relative to each other. The locking pin extends through the sleeve to facilitate releasably attaching the first jaw member and the second jaw member to a yoke of the in-line hydraulic cutting tool when installed. The spring member includes a first end attached to the proximal end portion of the first jaw member and a second end attached to the proximal end portion of the second jaw member, the spring member normally biasing the proximal end portion of the first jaw member and the proximal end portion of the second jaw member toward each other such that the first and second cutting blades are in an open position.

The present disclosure also includes exemplary embodiments of in-line hydraulic cutting tools. In one exemplary embodiment, the in-line battery-powered hydraulic cutting tool includes a handle assembly and a working head assembly. The handle assembly has an in-line type shape with a hand grip portion and a neck portion that includes a yoke. The working head assembly is operatively coupled to the yoke and includes for example, the jaw assemblies described herein.

In another exemplary embodiment, the in-line battery-powered hydraulic cutting tool includes a handle assembly and a working head assembly. The handle assembly has an in-line type shape having a hand grip portion and a neck portion that includes a yoke. The hand grip portion also includes at least one hydraulic pump used to move first and second jaw members in the working head assembly from the open position to a closed position, a wobble plate and at least one ball bearing positioned between the wobble plate and the at least one hydraulic pump. The working head assembly is operatively coupled to the yoke and includes for example, the jaw assemblies described herein.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 4 is a side elevation view of a second side of the working head assembly of FIG. 3;

FIG. 5 is a cross-sectional view of the working head assembly of FIG. 3 taken along line 5-5;

FIG. 10 is a cross-sectional view of a portion of the working head assembly of FIG. 4 taken from line 10-10;

FIG. 13 is a top plan view of the working head assembly and yoke of FIG. 11, illustrating a cross-section of a locking pin used to releasably secure jaws of the working head assembly together and to the yoke of the handle assembly;

FIG. 14 is a side elevation view with a cut-away portion of the second side of the working head assembly and yoke of the handle assembly of FIG. 11;

DETAILED DESCRIPTION

Figure 1:
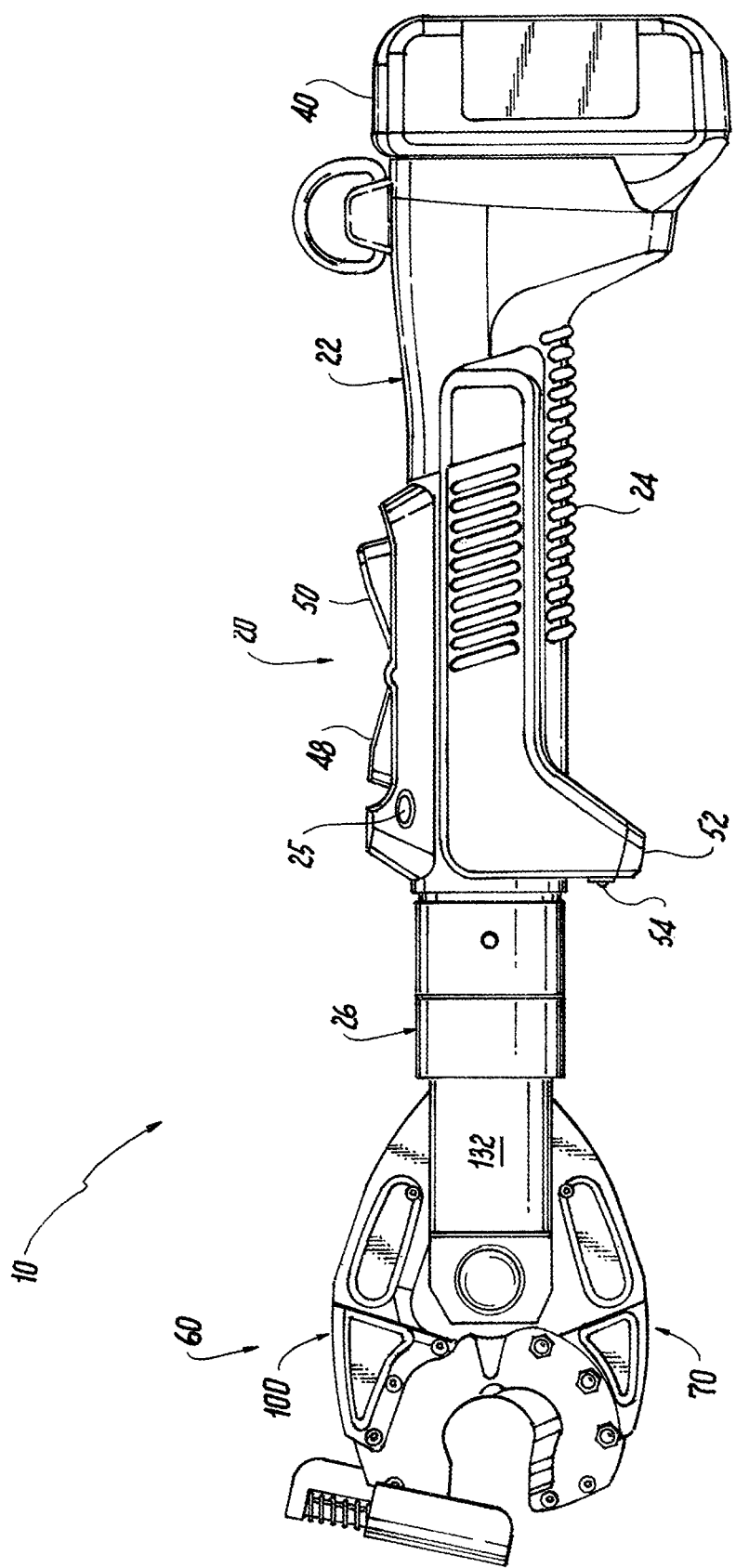
FIG. 1 is a side elevation view of a first side of an exemplary embodiment of a battery-powered tool according to the present disclosure, illustrating a working head assembly having cutting jaws and an in-line type handle assembly.

The present disclosure will be shown and described in connection with a portable, battery-powered, hand-held hydraulic tools. The description described herein will be in relation to a portable, battery-powered, hand-held hydraulic cutting tool. However, one of ordinary skill in the art will readily appreciate that the inventive concepts and aspects of the tool may be implemented in a wide variety of tools, fields and uses. For example, the tool may be a hydraulic crimping tool. Therefore, the present disclosure should not be deemed to be limited to the embodiments to the cutting tools shown in the drawings and described herein.

For ease of description, the portable, battery-powered, hydraulic tools according to the present disclosure may also be referred to as the "tools" in the plural and the "tool" in the singular. In addition, as used in the present disclosure, the terms "front," "rear," "upper," "lower," "upwardly," "downwardly," and other orientation descriptors are intended to facilitate the description of the exemplary embodiments disclosed herein and are not intended to limit the structure of the exemplary embodiments or limit the claims to any particular position or orientation.

Figure 2:
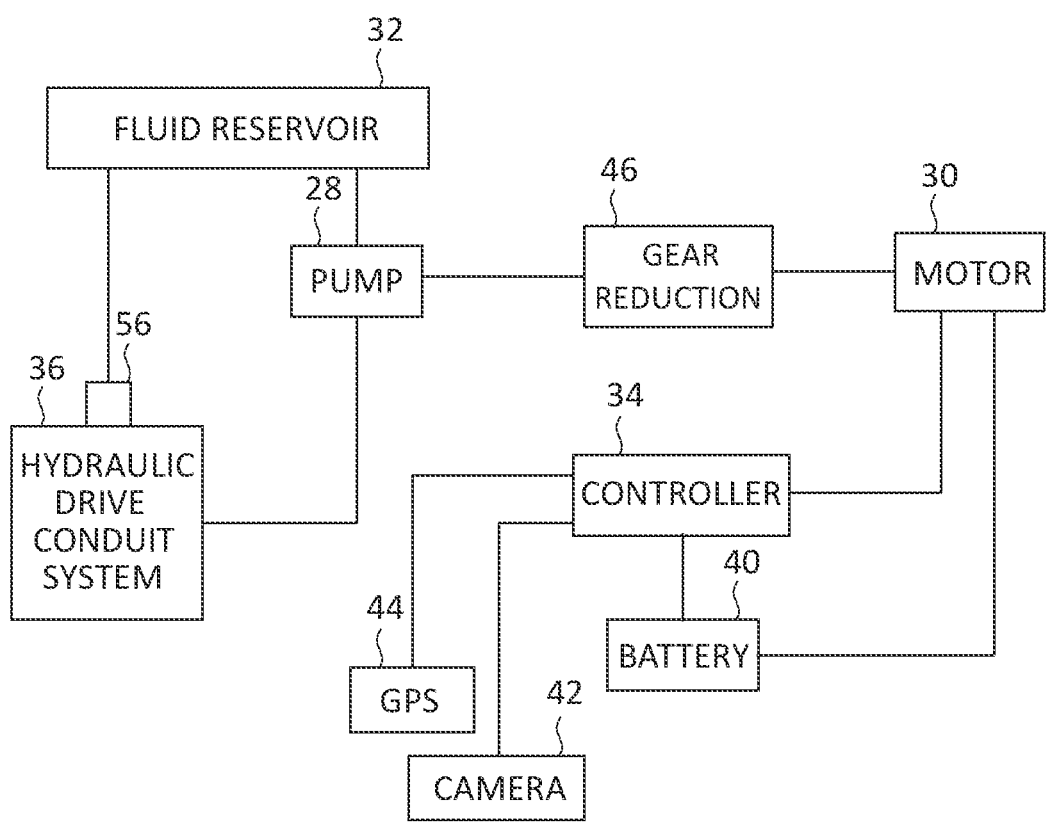
FIG. 2 is an exemplary block diagram for describing various parts of the tool shown in FIG. 1.

Referring to FIGS. 1 and 2, a battery-powered, hand held hydraulic tool 10 includes a handle assembly 20 that houses the hydraulic and electrical controls for the tool, seen in FIG. 2, and a working head assembly 60 that is operatively connected to the handle assembly 20. The handle assembly 20 includes a tool frame 22, a pump 28, a motor 30, a fluid reservoir 32, a controller 34, a hydraulic drive conduit system 36 and a battery 40. The tool frame 22 includes a hand grip portion 24 and a neck portion 26 in an in-line type shape. However, the tool frame 22 could be in any suitable type of shape, such as, for example, a pistol like shape or a suitcase type shape.

The pump 28, motor 30, fluid reservoir 32, controller 34 and hydraulic drive conduit system 36 are located within the grip portion 24 of the tool frame 22. The tool 10 may also include a camera 42, seen in block form in FIG. 2, mounted to the tool frame 22 and oriented to provide a video of a working area of the working head assembly 60. The tool 10 may also include a tool tracking system 44, seen in block form in FIG. 2, for tracking the location of the tool. In an exemplary embodiment, the tool tracking system 44 may include known GPS tracking components that receive GPS satellite signals and transmits the location of the tool to a remote station allowing a user to track the location of the tool. Such transmissions to remote stations may be achieved using known communication systems, such as for example, cellphone networks. The tool 10 may also include a planetary gear box 46, seen in FIG. 2, that would provide lower ratio/less torque and tangential forces which results in the need for fewer bearings.

The battery 30 is removably connected to one end of the grip portion 24 of the tool frame 22. In another embodiment, the battery 30 could be removably mounted or connected to any suitable position on the tool frame 22. In another embodiment, the battery 40 may be affixed to the tool 10 so that it is not removable. The battery 40 is preferably a rechargeable battery, such as a lithium ion battery, that can output a voltage of at least 16 VDC, and preferably in the range of between about 16 VDC and about 24 VDC. In the exemplary embodiment shown in FIG. 1, the battery 40 can output a voltage of about 18 VDC.

Continuing to refer to FIGS. 1 and 2, the motor 30 is coupled to the battery 40 and the controller 34, and its operation is controlled by the controller 34. Generally, the motor 30 is adapted to operate at a nominal voltage corresponding to the voltage of the battery 40, e.g., between about 16 VDC and about 24 VDC. For example, if the battery 40 is adapted to output a voltage of about 18 VDC, then the motor 30 would be adapted to operate at a voltage of about 18 VDC. Under a no-load condition, such a motor 30 can operate at about 21,000 rpm with a current of about 2.7 amps. At maximum efficiency, the motor 30 can operate at about 15,000 rpm with a current of about 12 amps, a torque of about 75 mN–m, and an output of about 165 W. An example of such an 18 VDC motor 30 is the RS-550VC-7030 motor, manufactured by Mabuchi Motor Co., Ltd. of Chiba-ken, Japan. However, as noted above, any suitable type of motor adapted to operate at or above a 16 VDC nominal voltage could be used. As another example, the motor may be a motor adapted to operate at a 24 VDC nominal voltage. The output shaft of the motor 30 is connected to the pump 28 by a gear reduction assembly or gearbox 46, shown in block form in FIG. 2. Any suitable type of gear reduction assembly 46 could be used.

The grip portion 24 of the tool frame 22 includes one or more operator controls, such as switches 48 and 50, which can be manually activated by an operator. The grip portion 24 of the tool frame 22 may include a hand guard or hilt 52 that can protect an operators hand while operating the tool 10. The hilt 52 may include an indicator 54, e.g., a light such as an LED, that is operatively connected to the controller 34 such that when a switch 48 or 50 is actuated the light activates to illuminate the working area of the working head assembly 60. According to an embodiment of the present disclosure, one of the switches (e.g., switch 48) may be used to activate a piston (not shown) associated with the hydraulic drive conduit system 36 system to activate the working head assembly 60 such that the work head assembly moves toward a closed position. The other switch (e.g., switch 50) may be used to retract the piston so that the working head assembly 60 moves to a home (or open) position, shown in FIG. 1. The operator controls, e.g., switches 48 and 50, are operably coupled to the controller 34.

The tool 10 may include a pressure relief valve 56, e.g., a poppet valve seen in block form in FIG. 2, connected to the hydraulic drive conduit system 36. The pressure relief valve 56 is adapted to open when the conduit system 36 reaches a predetermined minimum hydraulic pressure threshold, such as about 6,500 psi. When the pressure relief valve opens, hydraulic fluid being pumped by the pump 28 can exit the conduit system 36 and return to the fluid reservoir 32. The poppet valve 56 can be adapted to generate an audible sound when it opens. This audible sound can signal to the operator that the tool 10 has reached its maximum predetermined hydraulic pressure and, thus, the action of the working head assembly 60, e.g., a cutting action or a crimping action, is completed.

In the exemplary embodiment shown in FIG. 2, the controller 36 is adapted to sense a current drop of electricity to the motor 30. When the pressure relief valve 56 opens, resistance to rotation of the motor 30 is reduced such that the motor draws less current. The controller 36 senses this current drop via a current sensor (not shown), and automatically deactivates the motor 30 for a predetermined period of time. In one embodiment, the predetermined period of time is between about 2 seconds and about 3 seconds. However, any suitable predetermined period of time could be set. In another embodiment, the controller 34 could be adapted to deactivate the motor 30 until a reset button or reset like procedure is performed by the operator. With this type of system, an operator can sense via tactile feedback that the motor 30 and pump 28 have stopped and would not need to rely on an audible signal being heard or a visual signal from the indicator 54 positioned on the tool 10.

Figure 3:
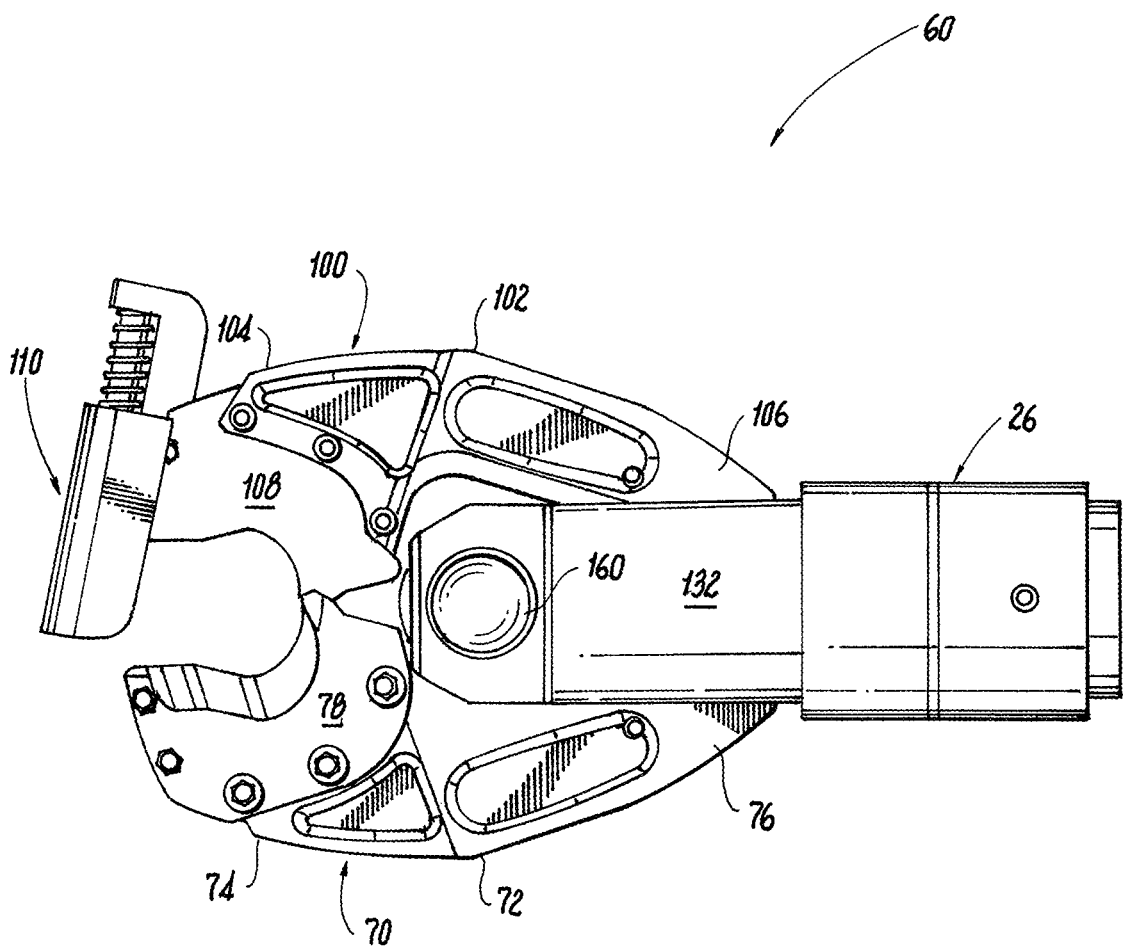
FIG. 3 is side elevation view of a first side of the working head assembly of FIG. 1 in an open position and secured to a yoke of the handle assembly.
Figure 6:
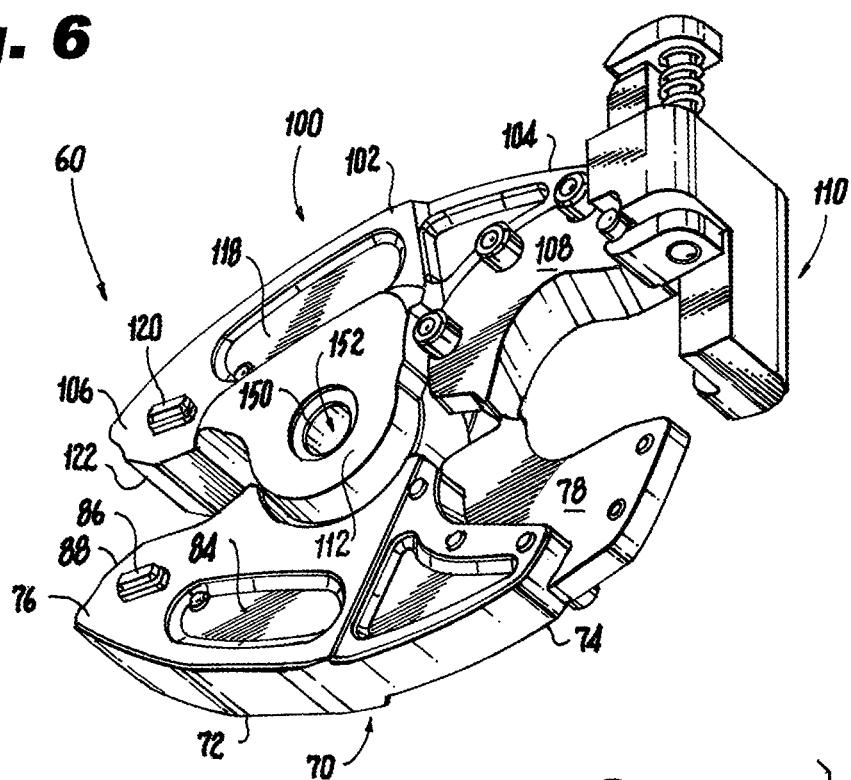
FIG. 6 is a bottom side perspective view of the second side of the working head assembly of FIG. 4.
Figure 7:
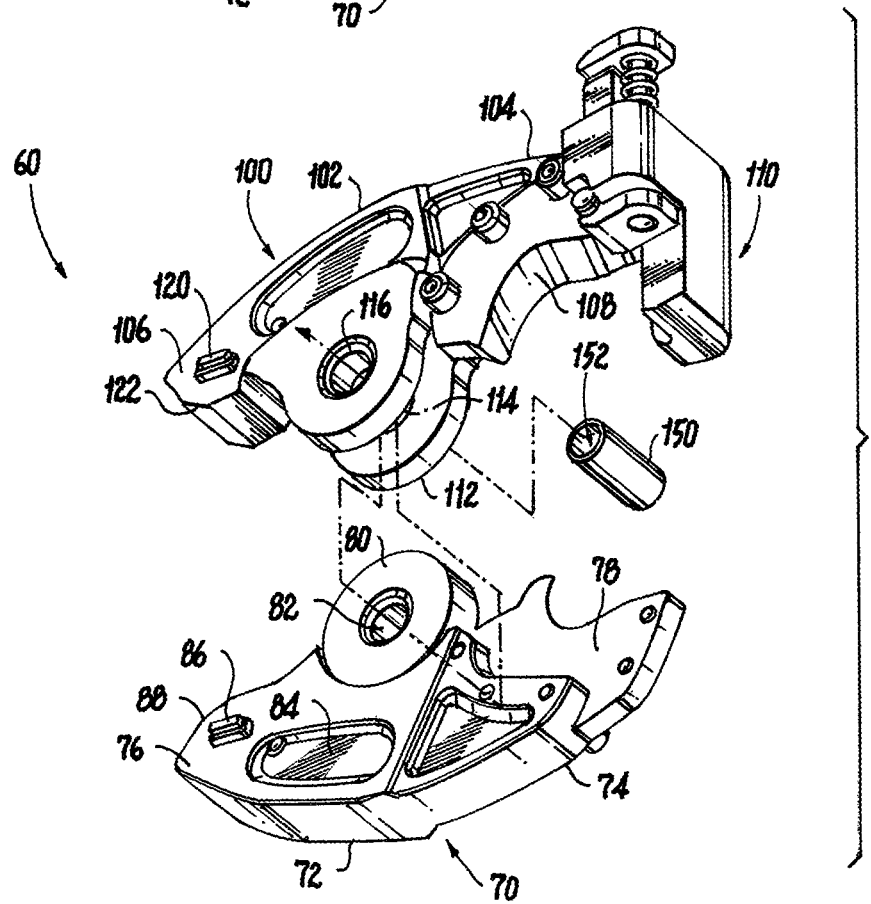
FIG. 7 is a bottom side perspective view of the second side of the working head assembly of FIG. 6 with the jaw members separated.
Figure 8:
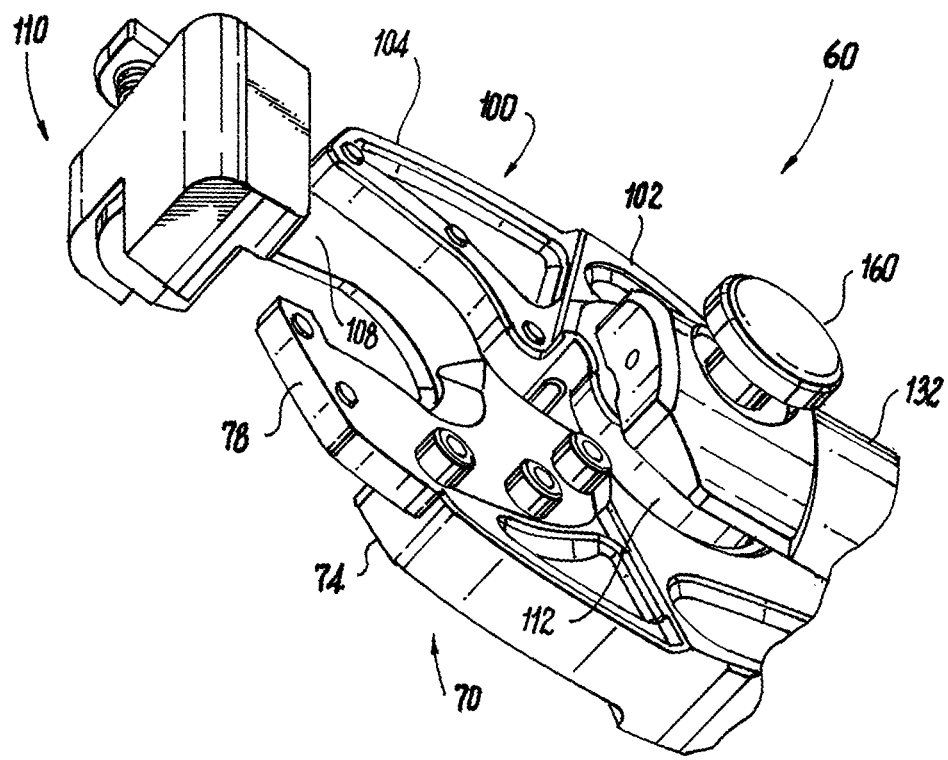
FIG. 8 is a bottom side perspective view of the first side of the working head assembly of FIG. 3 releasably secured to a yoke of the handle assembly.
Figure 9:
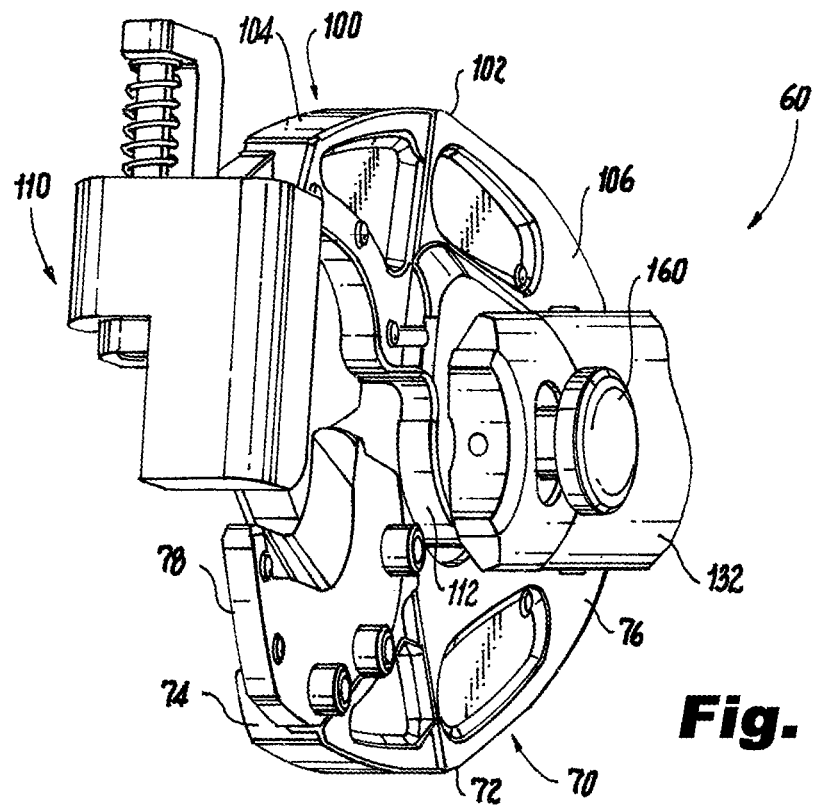
FIG. 9 is a front perspective view of the first side of the working head assembly and yoke of the handle assembly of FIG. 8.
Figure 11:
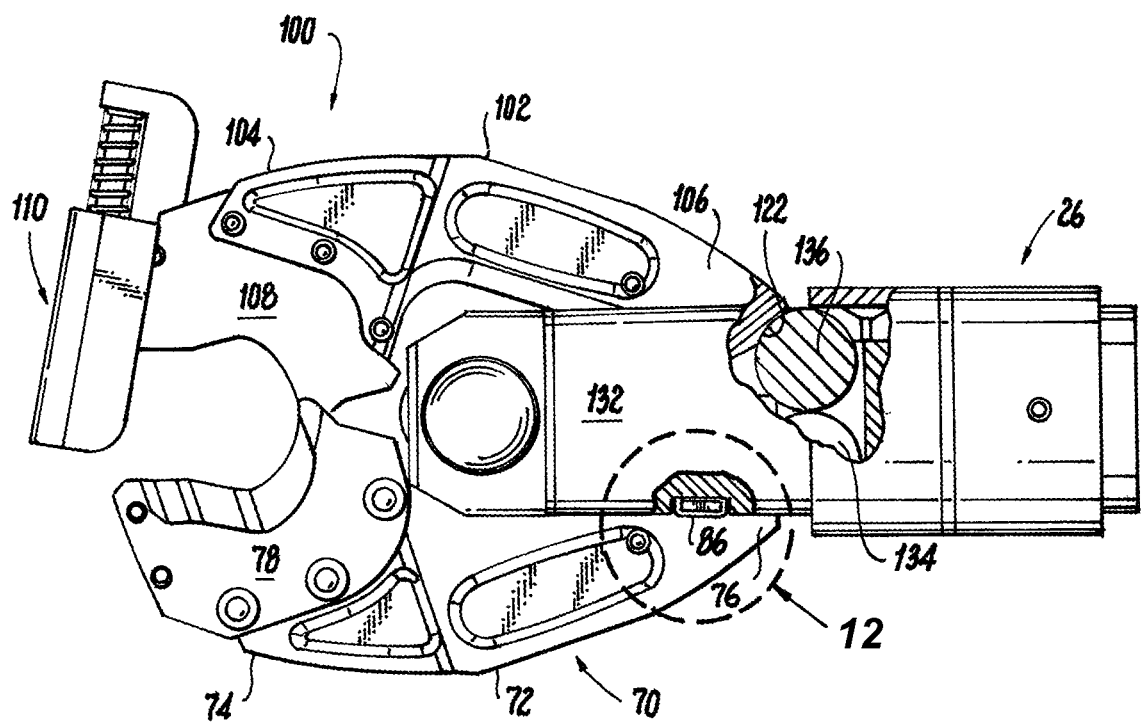
FIG. 11 is side elevation view in partial cut-away of the first side of the working head assembly of the tool of FIG. 1 in an open position and releasably secured to a yoke of the handle assembly.
Figure 12:
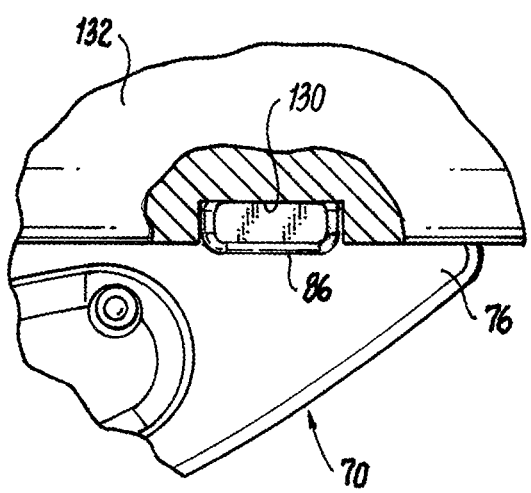
FIG. 12 is an enlarged view of a portion of the working head assembly and yoke of the handle assembly of FIG. 11 taken from detail 12.

The working head assembly 60 includes a pair of cooperating jaw members—a first jaw member 70 and second jaw member 100. As shown on FIGS. 3 and 4, the first jaw member 70 includes a curved pressing lever 72 having a distal end portion 74 and a proximal end portion 76. An interior portion of the pressing lever 72 defines one or more working surfaces 78, e.g. a cutting surface (or blade) or a crimping surface (or crimping die). As will be appreciated by one skilled in the art, if the working surface is a cutting surface, the cutting surface may be a replaceable cutting blade attached to the jaw member 70 with, for example, mechanical fasteners or spring locking fasteners, or the cutting surface can be a permanent cutting blade. Similarly, the second jaw member 100 includes a curved pressing lever 102 having a distal end portion 104 and a proximal end portion 106. An interior portion of the pressing lever 102 defines one or more working surfaces 108, e.g. a cutting surface (or blade) or a crimping surface (or crimping die). As will be appreciated by one skilled in the art, if the working surface is a cutting surface, the cutting surface may be a replaceable cutting blade attached to the jaw member 100 with, for example, mechanical fasteners or spring locking fasteners, or the cutting surface can be a permanent cutting blade. The second jaw member 100 may also include an optional guide member 110 attached to the working surface 108 or the distal end portion 104 of the jaw member 100. The guide member 110 is provided to guide the working surfaces 78 and 108 of the working head assembly 60 and to limit the working surfaces 78 and 108 of the jaw members 70 and 100, respectively, from separating or spreading apart when in the working head assembly is activated. For example, if the working surfaces 78 and 108 are cutting blades, the guide member 110 limits the cutting blades from separating or rotating when performing a cutting operation.

Referring to FIGS. 4-7, the jaw members 70 and 100 are connected to one another using an interlocking mechanism on one or both of the jaw members. For example, the interlocking mechanism may be a tongue in groove type configuration or a clevis, tang and pin type configuration. More specifically, in the embodiment shown the first jaw member 70 includes a tang 80, seen in FIG. 7, having a bore 82, and the second jaw member 100 includes a clevis 112, seen in FIG. 7, having bores 114 and 116 through the sides of the clevis, as shown. In this configuration, to connect the jaw members together the tang 80 is positioned within the clevis 112. A sleeve or bushing 150 having a central opening 152 is disposed within the bores 82, 114 and 116, seen in FIGS. 5 and 7. The sleeve 150 holds the two jaw members 70 and 100 together until a locking pin 160 connects the jaw members to the neck portion 26 of the handle assembly 20 of the tool 10. More specifically, the sleeve 150 allows the locking pin 160 to slide in one continuous surface when connecting the jaw members to the neck portion which permits easier installation of the jaw members 70 and 100 to the handle assembly 20. In other words, the sleeve 150 allows the locking pin 160 to glide through areas or seems where the jaw members 70 and 100 meet without catching on a jaw member in the event the jaw members are slightly offset or have gaps. Additionally, the sleeve 150 keeps the jaw members 70 and 100 of the working head assembly 60 together for easier handling when the locking pin 160 is removed from the tool 10, as discussed below.

As shown in FIGS. 6-9, the jaw members 70 and 100 are configured to open and close relative to one another using the clevis, tang and locking pin arrangement noted above or a tongue-and-groove arrangement. The clevis and tang arrangement allows the jaw members 70 and 100 to pivot around sleeve 150 and thus the locking pin 160 such that the jaw members can move between open and closed positions. When moving the jaw members 70 and 100 to the open position, seen in FIG. 4, the jaw members pivot causing the working surfaces 78 and 108 to move away from each other to permit access to the working surfaces of the jaw members. When moving the jaw members 70 and 100 to the closed position, the jaw members pivot causing the working surfaces 78 and 108 to advance towards each other and possibly passing one another.

Using the clevis-and-tang or tongue-and-groove configuration allows the working head assembly 60 to maintain the forces acting on the jaw members symmetrical, as well as reducing the stress on the jaw members, thereby allowing for a smaller, lighter weight design. Specifically, as will be appreciated by one of ordinary skill in the art, prior art jaws are designed as hermaphroditic pairs. As such, similar to a pair of ordinary scissors attempting to cut a piece of cardboard, the forces and tolerances lead to binding and bending and other problems from the asymmetric application of forces. With the clevis-and-tang or tongue-and-groove configuration, all of the forces are symmetrically applied to the jaws. In addition, this configuration allows for tighter tolerances to further enhance performance of the mating jaw members.

A lighter weight design of the jaws is also achieved, at least in part, on some embodiments by the provision of one or more "pockets" or areas where the cross section of each jaw member 70 and 100 is thinner in a desired shape. For example, in the embodiment shown in FIGS. 4 and 6, the first jaw member 70 has pockets 84 on one or both sides of the jaw member, and the second jaw member 100 has pockets 118 on one or both sides of the jaw member. These pockets 84 and 118 not only serve as weight reduction pockets, but can also absorb stress in a more uniform manner across the operative portions of the jaw members. One of ordinary skill in the art armed with the present disclosure can design the pockets of any suitable size and shape depending on the material of construction and overall design of the jaws through routine experimentation in order to achieve one or more of the advantageous features of the weight reduction pockets.

In addition, as shown in FIGS. 4 and 10, a lighter weight design is also achieved by tapering at least the distal end portion 74 of the first jaw member 70 and the distal end portion 104 of the second jaw member 100. In an exemplary embodiment shown in FIG. 10, the distal end portions 74 and 104 are tapered in a generally I-shaped cross section where the jaw member tapers at a predefined angle, such as for example a 6-degree angle. The variable cross-section of the distal end portions 74 and 104 of the jaw members 70 and 100, respectively, reduces weight by reducing the material used to form the jaw members. Additionally, as will be appreciated by one of ordinary skill in the art, the casting process is not only made easier by the tapered configuration, but also results in a superior product. Specifically, tapering the mold used to cast the jaw members helps the flow of material when casting the jaw members. The tapering allows the material to cool evenly from the edges inwardly, as opposed to cooling in patches that can occur without a taper. The present disclosure also contemplates that the tapering allows the flow rates and pressure of the fabrication process to be optimized to a point that the material does not start cooling before it spreads throughout the casting mold. This, in turn, facilitates the even cooling from the edges inward.

While a generally I-shaped cross section with a predefined taper, e.g., a 6-degree taper, is shown for portions of the jaw members, one of ordinary skill in the art would appreciated that any suitable configuration that lessens the weight and/or improves the fabrication of the jaw members while not compromising strength should be understood to be within the scope of the present application. One of ordinary skill in the art would readily appreciate that during a working operation of the jaw members 70 and 100 of the working head assembly 60, the proximal end portion 76 or 106 of each jaw member 70 or 100, respectively, typically receives more stress so that the proximal end portions of the jaw members are preferably fabricated to be thicker. Further, tapering along the length or a portion of the length of the jaw members as described herein facilitates a uniform distribution of the forces on applied to the jaw members. One of ordinary skill in the art armed with the present disclosure can configure jaw members with the tapering and/or pockets described herein in a manner to achieve one or more of the uniform stress distribution and weight reduction features described based on the ultimate design and material of construction of the jaw members.

Referring now to FIGS. 11-21, the jaw members 70 and 100 are configured for easy connection to and removal from the handle assembly 20 of the tool 10. As shown, the proximal end portion 76 of the first jaw member 70 includes a raised tab 86 on one or both sides of the jaw member, and the proximal end portion 106 of the second jaw member 100 includes a raised tab 120 on one or both sides of the jaw member. The raised tabs 86 and 120 serve as stops. More specifically, the raised tabs 86 and 120 are preferably positioned to facilitate connecting the jaw members 70 and 100 of the working head assembly 60 to the handle assembly 20 by allowing the jaw members to only open an amount that results in the locking pin 160 being aligned with the central opening 152 of the sleeve 150, thus freeing the hands of a user when connecting the working head assembly 60 to the handle assembly 20 or when removing the working head assembly from the handle assembly. A user can now allow the jaw members 70 and 100 to release and fall open as shown in FIGS. 11-20, leaving the jaws aligned.

In addition, in the exemplary embodiment shown, each raised tab 86 and 120 are sized and configured to mate with a respective tab notch 130 provided in an inner surface of a yoke 132 of the neck portion 26 of the handle assembly 20. When the raised tabs 86 and 120 are positioned in their respective tab notches 130 the bores 82, 114 and 116 are aligned so that the sleeve 150 and locking pin 160 can connect the jaw members 70 and 100 to the yoke 132, and allows a roller 134, seen in FIG. 11, positioned within the yoke to reduce friction between the first jaw member and the locking pin 160 by maintaining a distance from the cam surface 88, seen in FIG. 6, on the first jaw member 70, and allows another roller 136, seen in FIG. 11, positioned within the locking pin 160 to reduce friction between the second jaw member and the yoke by maintaining a distance from cam surface 122 on the second jaw member 100. It is noted that the gap between the rollers and the cam surface created by the raised tabs 86 and 120 isolates the spring force from the spring member 180 from the locking pin 160. Isolating the spring force from the spring member 180 from the locking pin 160 helps to limit or prevent the locking pin 160 from binding in the sleeve 150 when removing the jaw members 70 and 100 from the yoke 132.)

Figure 15:
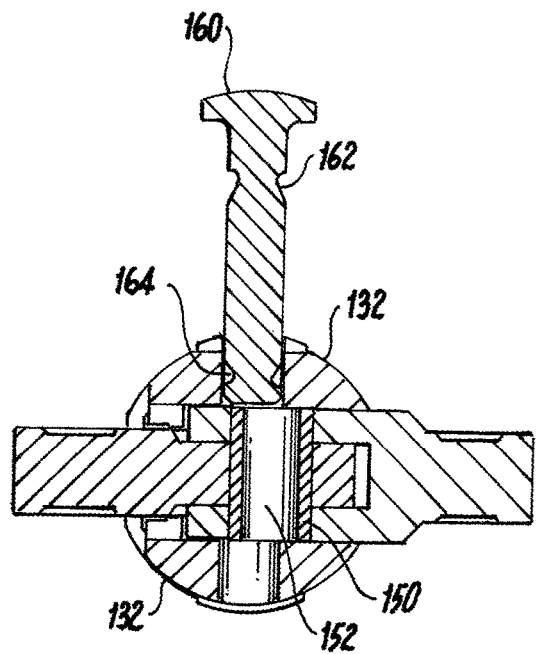
FIG. 15 is a cross-sectional view of the working head assembly and yoke of the handle assembly of FIG. 13 taken along line 15-15.
Figure 16:
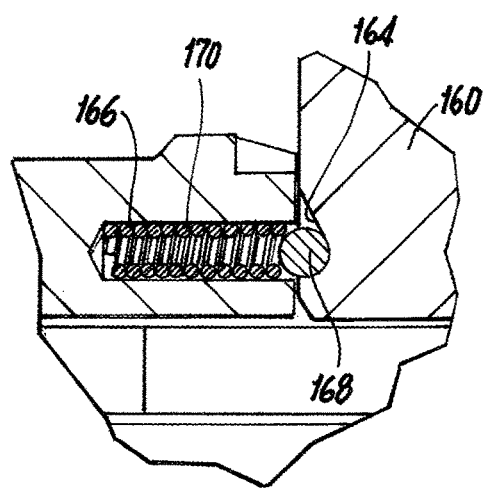
FIG. 16 is an enlarged view in partial cross-section of the working head assembly and yoke of the handle assembly of FIG. 13 taken from detail 16.
Figure 17:
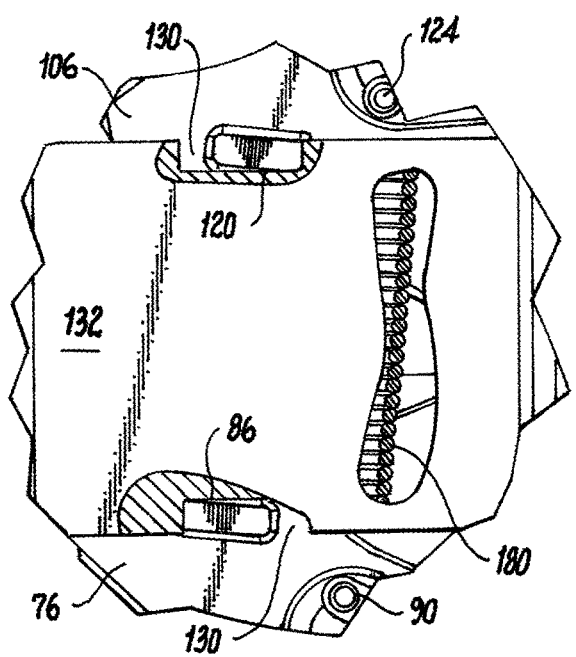
FIG. 17 is an enlarge side elevation view of a portion of the working head assembly and yoke of the handle assembly of FIG. 14 taken from detail 17.
Figure 18:
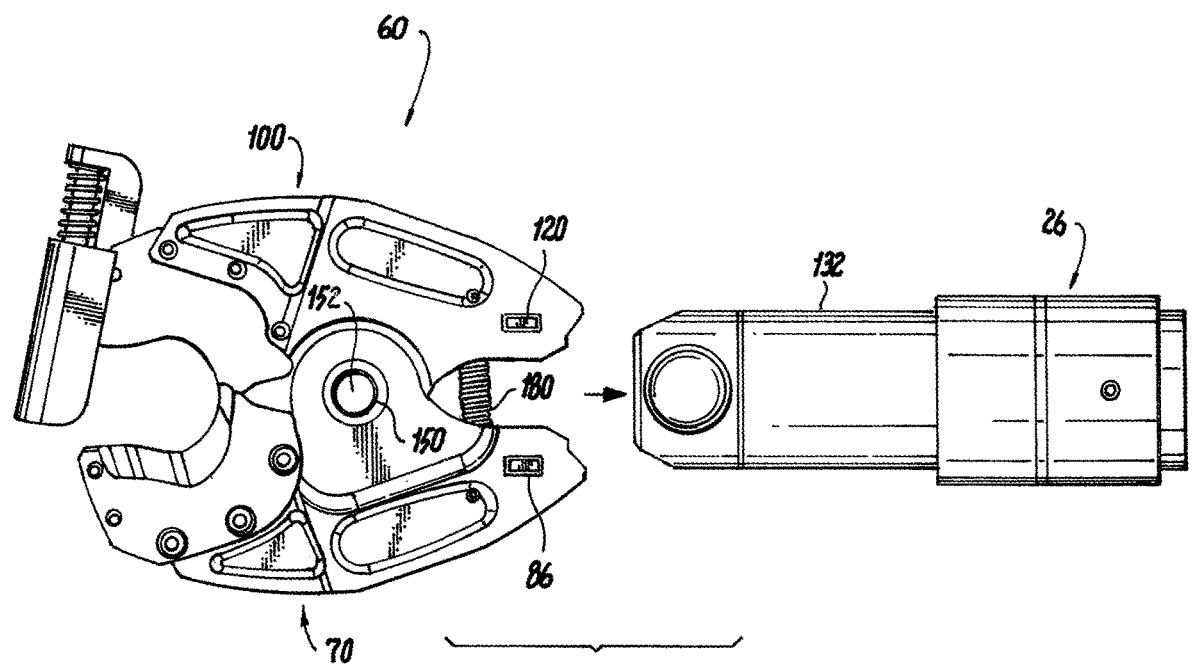
FIG. 18 is a side elevation view of the first side of the working head assembly separated from the yoke of the handle assembly of the tool of FIG. 1.
Figure 19:
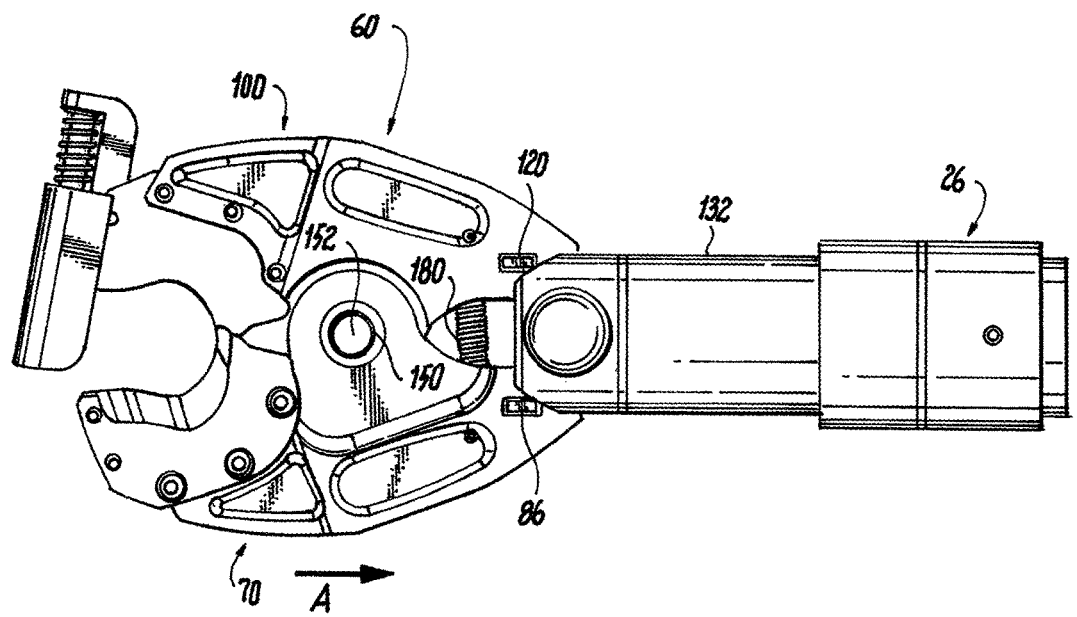
FIG. 19 is a side elevation view of the first side of the working head assembly moving toward and engaging the yoke of the handle assembly of the tool of FIG. 1.
Figure 20:
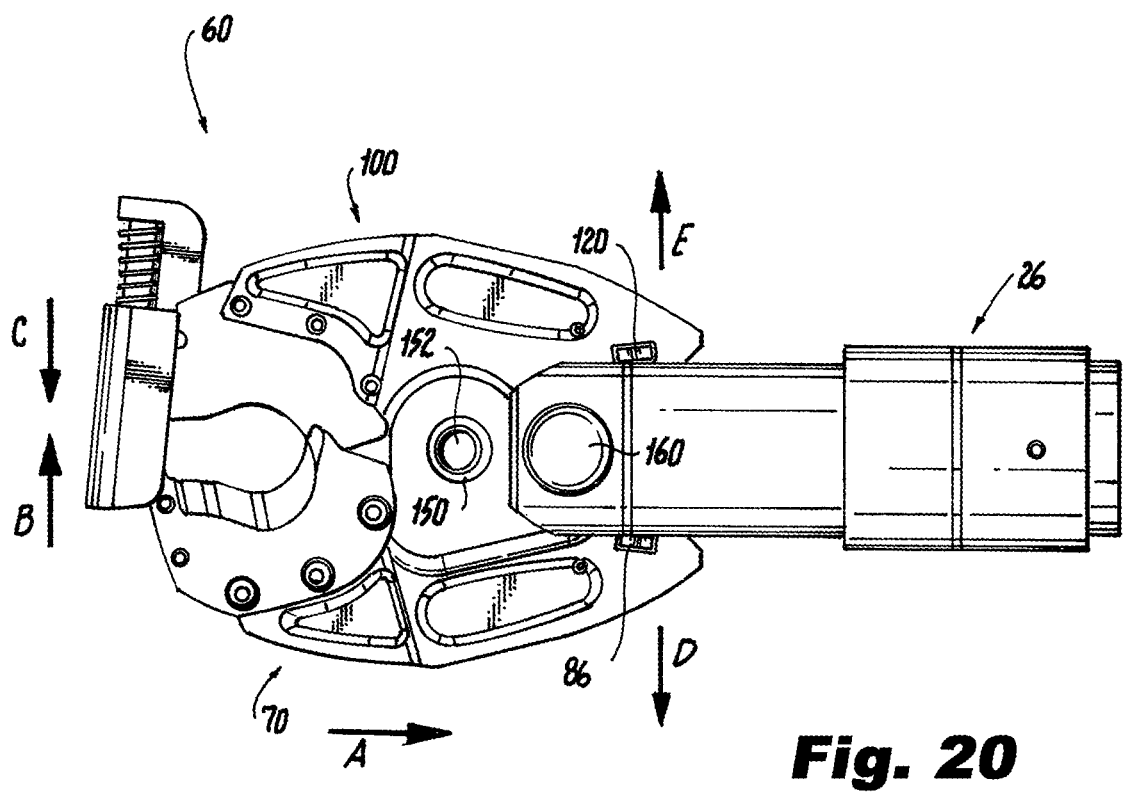
FIG. 20 is a side elevation view of the first side of the working head assembly engaging the yoke of the handle assembly of the tool of FIG. 1, illustrating a distal end of jaws of the working head assembly being moved toward each other.
Figure 21:
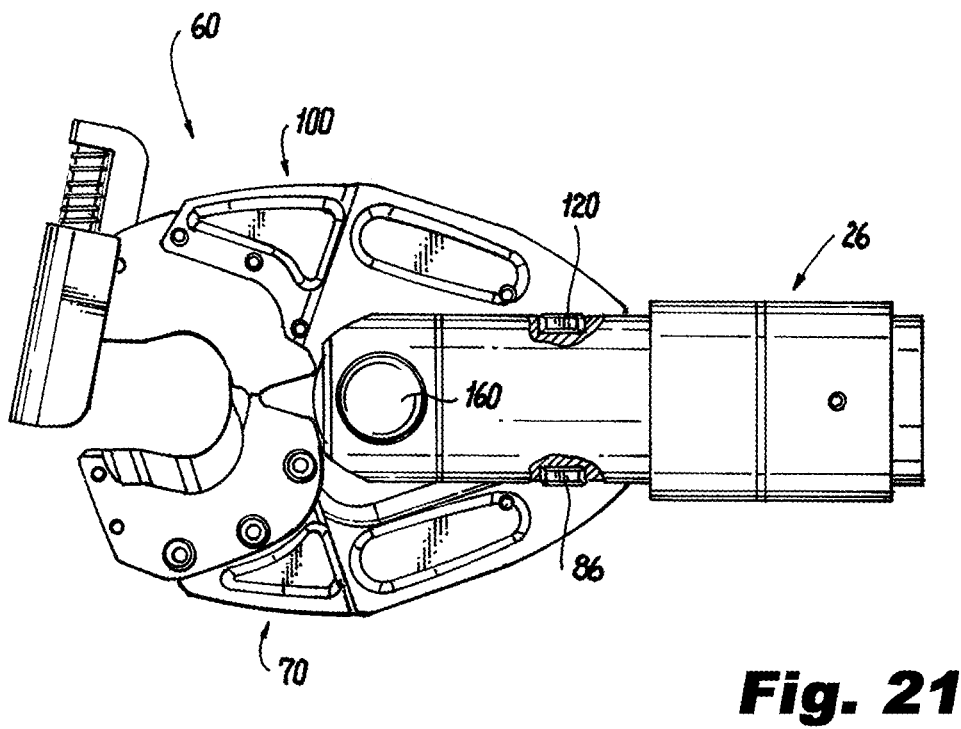
FIG. 21 is a side elevation view of the first side of the working head assembly releasably and fully engaged with the yoke of the handle assembly of the tool of FIG. 1.
Figure 22:
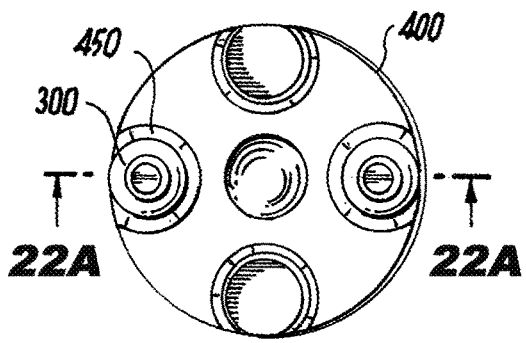
FIG. 22 is a top plan view of an exemplary embodiment of a wobble plate assembly in a first position and used in the tool of the present disclosure.
Figure 23:
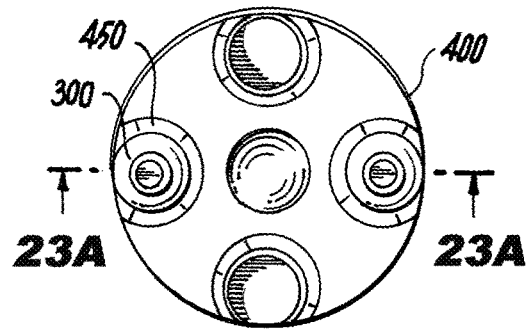
FIG. 23 is a top plan view of an exemplary embodiment of a wobble plate assembly in a second position and used in the tool of the present disclosure.
Figure 22A:
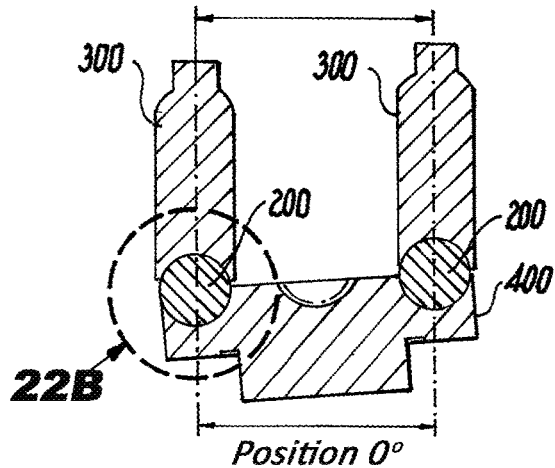
FIG. 22A is a cross-sectional view of the wobble plate assembly of FIG. 22 taken along line 22A-22A.
Figure 23A:
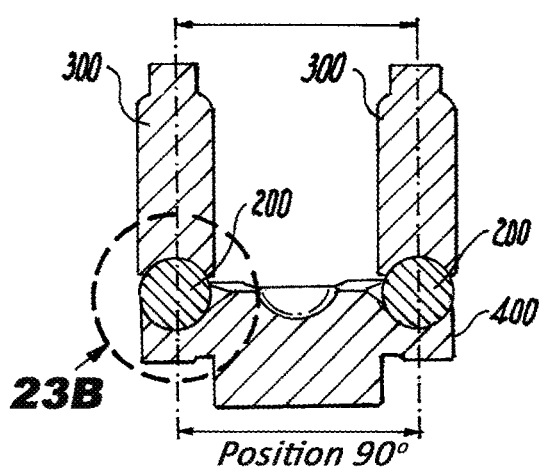
FIG. 23A is a cross-sectional view of the wobble plate assembly of FIG. 23 taken along line 23A-23A.
Figure 22B:
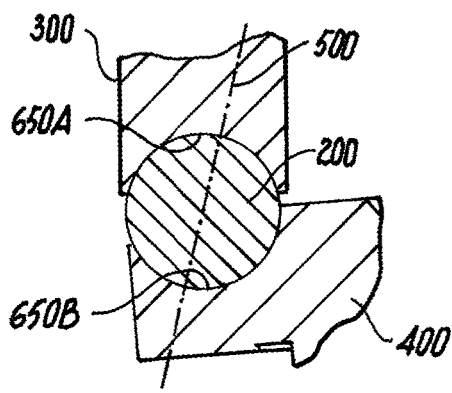
FIG. 22B is an enlarged view of a portion of the wobble plate assembly of FIG. 22A taken from detail 22B.
Figure 23B:
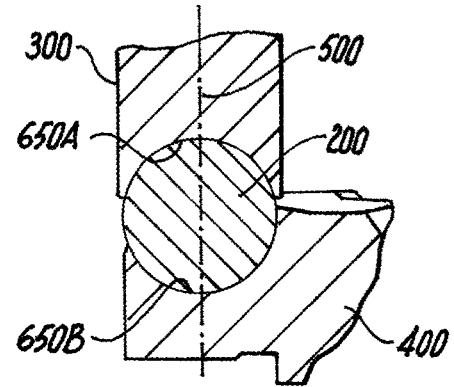
FIG. 23B is an enlarged view of a portion of the wobble plate assembly of FIG. 23A taken from detail 23B.
Figure 24:
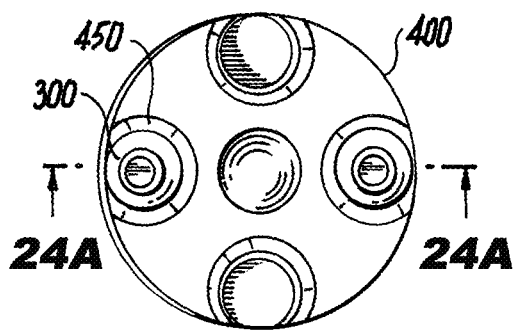
FIG. 24 is a top plan view of an exemplary embodiment of a wobble plate assembly in a third position and used in the tool of the present disclosure.
Figure 25:
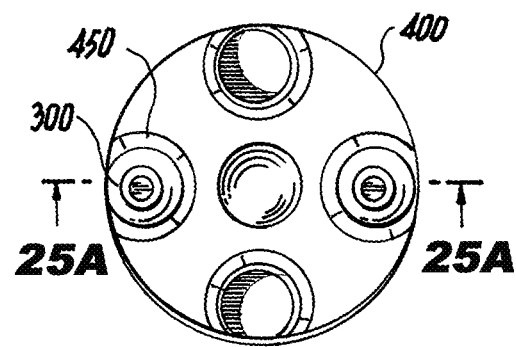
FIG. 25 is a top plan view of an exemplary embodiment of a wobble plate assembly in a fourth position and used in the tool of the present disclosure.
Figure 24A:
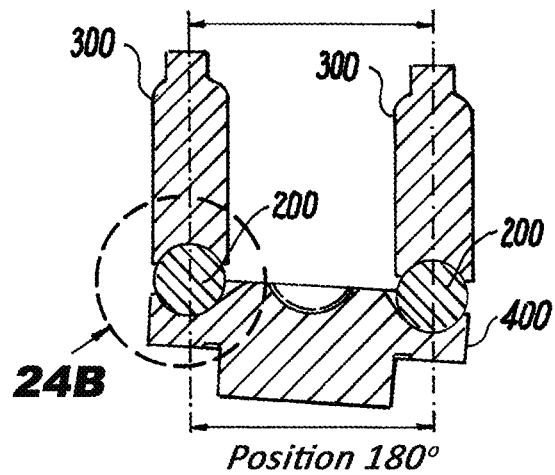
FIG. 24A is a cross-sectional view of the wobble plate assembly of FIG. 24 taken along line 24A-24A.
Figure 25A:
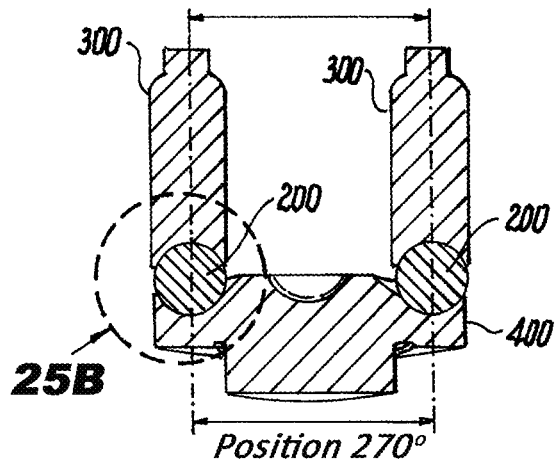
FIG. 25A is a cross-sectional view of the wobble plate assembly of FIG. 25 taken along line 25A-25A.
Figure 24B:
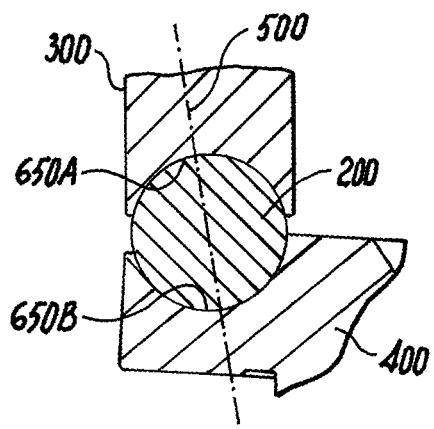
FIG. 24B is an enlarged view of a portion of the wobble plate assembly of FIG. 24A taken from detail 24B.
Figure 25B:
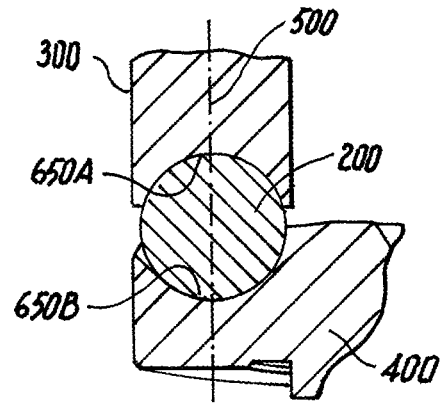
FIG. 25B is an enlarged view of a portion of the wobble plate assembly of FIG. 25A taken from detail 25B.

Referring to FIGS. 8, 9, 13 15 and 16, as noted above, the working head assembly 60 is releasably secured to the neck portion 26 of the handle assembly 20 via the locking pin 160. The locking pin 160 can move between an extended position, seen in FIG. 13, and an inserted position, seen in FIGS. 8 and 9. As shown in FIGS. 13 and 15, the locking pin includes a first detent 162 around the perimeter of the pin and a second detent 164 around the perimeter of the pin. The detents 162 and 164 interact with a spring and ball assembly. More specifically, the spring 166 and ball 168, seen in FIG. 16, are positioned within a bore 170 in the yoke 132, as shown in FIGS. 13 and 16. The spring 166 normally biases the ball 168 toward the locking pin 160. When the locking pin 160 is in the inserted position the ball is biased into detent 162 to lock the locking pin in the inserted position. When the locking pin 160 is in the extended position the ball is biased into detent 164 to lock the locking pin in the extended position.

When the raised tabs 86 and 120 are positioned into their respective tab notches 130, the jaw members 70 and 10 are prevented from falling out of the yoke 132 of the neck portion 26 of the handle assembly 20 when the locking pin 160 is in the extended position. Additionally, when the locking pin 160 is in the extended position such that the locking pin is removed from the bore holes in the jaw members 70 and 100, the jaw members not only remain connected to the yoke 132, but also spring tension from spring member 180, seen in FIGS. 17, 18 and 19, coupled between the distal end portions 76 and 106 of the jaw members 70 and 100, respectively, causes the raised tabs 86 and 120 to be held within the tab notches 130 in the yoke 132. One end of the spring member 180 is connected to the distal end portion 76 of the first jaw member 70 and the opposing end of the spring member 180 is connected to the distal end portion 106 of the second jaw member 100 by a connection accessed through spring pin holes 90 and 124, seen in FIG. 17, in the respective jaw member. As will be appreciated, the spring member 180 normally bias the jaw members 70 and 100 toward the open position.

As noted above, as shown in FIGS. 17-21, if the locking pin 160 is moved to the extended position, described above, and the jaw members 70 and 100 are removed from the yoke 132, the jaw members are still held together by the sleeve 150. The jaw members 70 and 100 may move slightly, but once the raised tabs 86 and 120 are positioned in their respective tab notches 130, the jaw members are held in place.

Various embodiments of the present disclosure lend themselves to the provision of additional advantageous features. For example, the tool 10 may make use of a trigger lock 25 that can slide relative to the switches 48 and 50 to prevent activation of the switches for added safety. The trigger lock can be configured to require release for every operation of the working head assembly, such as the working operation of cutting blades for a cutting tool or the working operation of crimping dies for a crimping tool. Turning now to FIGS. 22-28, the handle assembly 20 of the tool 10 may also include an improved interface between a wobble plate 400 and pumps 300 which are part of the hydraulic drive system within the handle assembly 20. The improved interface includes a ball bearing 200 disposed between the pump 300 and a wobble plate 400. The operation of the pump 300 and wobble plate 400 are well understood in the art and the details of which will not be discussed herein. As shown in FIGS. 22-28, two pumps 300 are spaced about 0.800" apart in the hydraulic pump body 310, seen in FIG. 28, and likewise, spherical pockets 450 in the wobble plate 400 are also machined to about 0.800" apart. However, since the wobble plate 400 is typically constrained at an angle (4 degrees), at certain points in the rotation, the effective distance between the two spherical cutouts is less than the 0.800" pump distance. As will be appreciated by one of ordinary skill in the art, if the pump was directly contacting the wobble plate 400, this would cause a sliding motion in that interface. A more detailed description of the wobble plate and pumps is described in commonly owned U.S. patent application Ser. No. 15/584,658, filed on May 2, 2017 which is incorporated herein in its entirety by reference.

Figure 26:
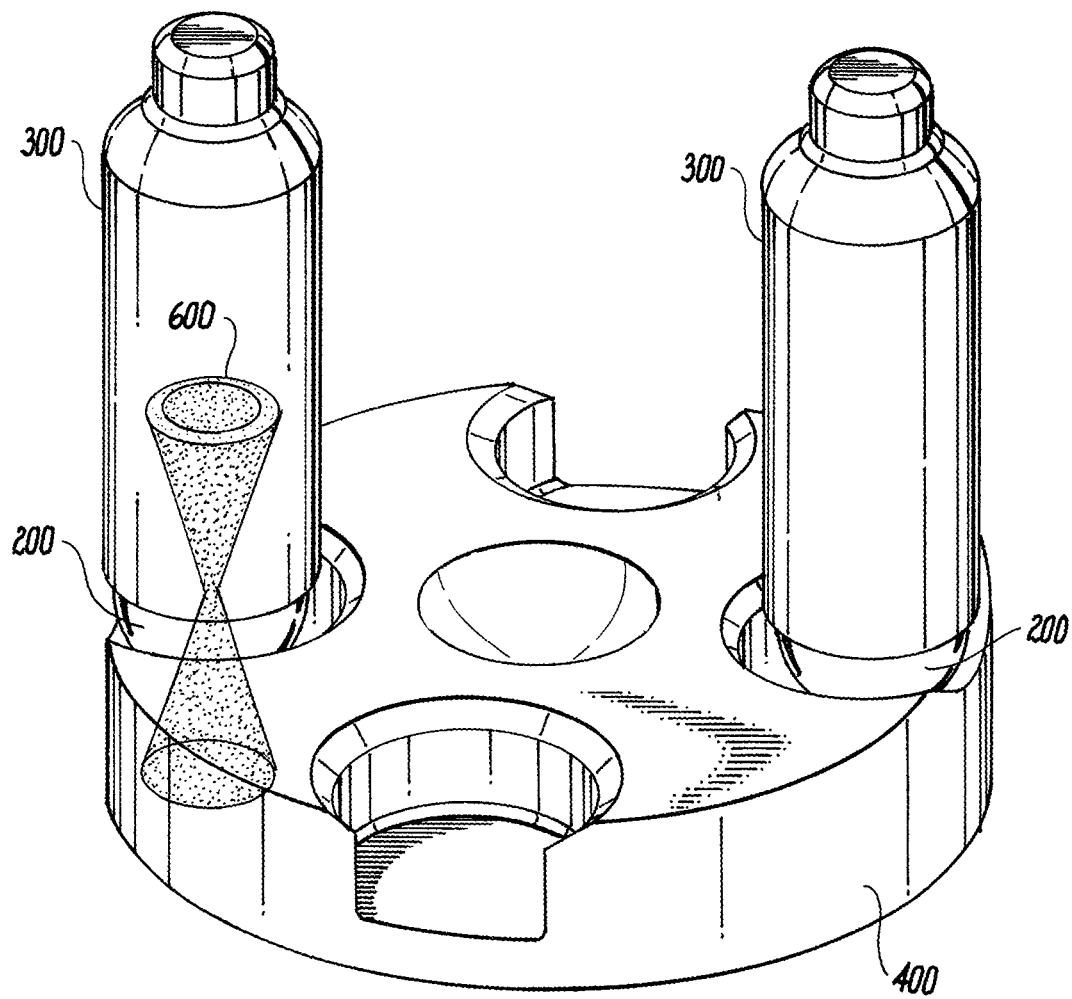
FIG. 26 is a perspective view of an exemplary embodiment of the wobble plate assembly according to the present disclosure.
Figure 27:
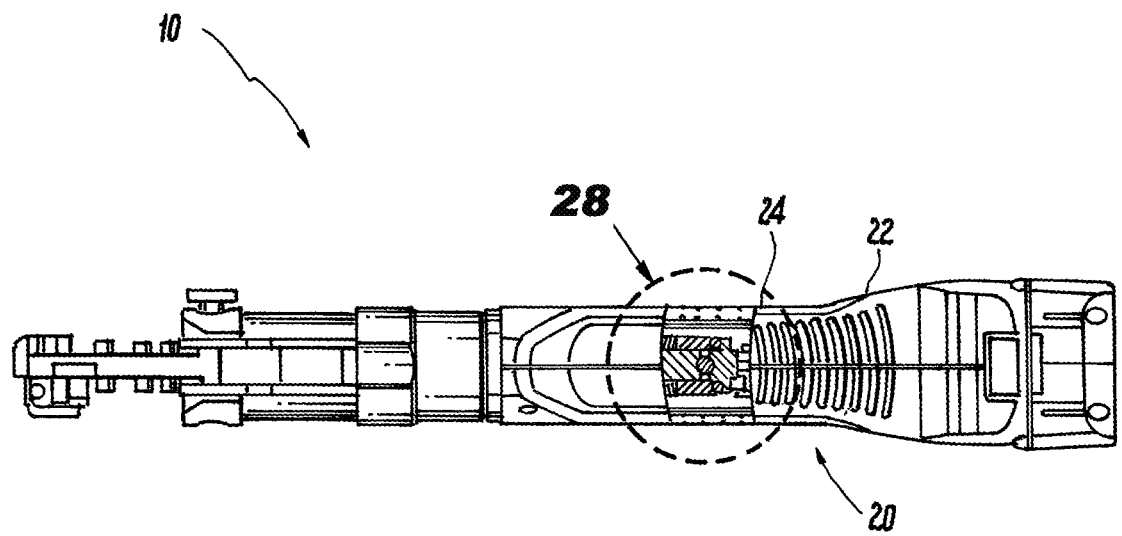
FIG. 27 is a bottom plan view of the tool of FIG. 1.
Figure 28:
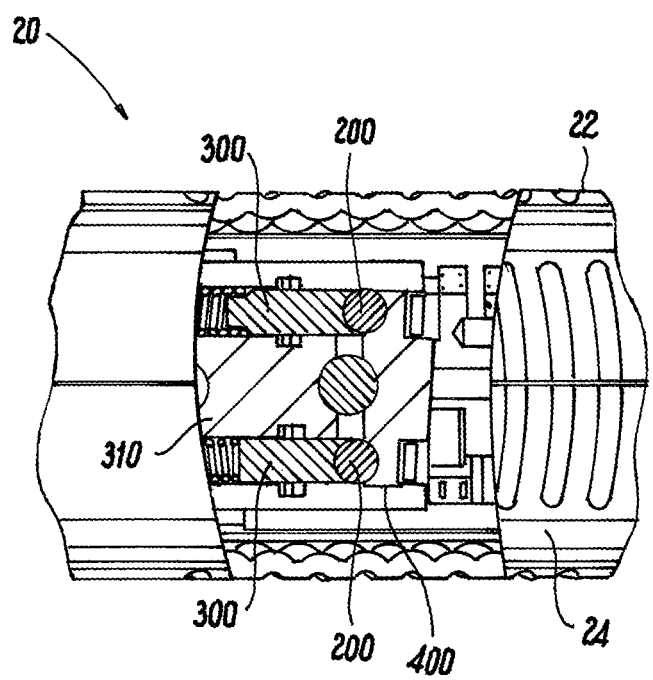
FIG. 28 is an enlarged view of a portion of the tool of FIG. 27 taken from detail 28, illustrating the wobble plate within the handle assembly of the tool.

As will be appreciated by one of ordinary skill in the art armed with the present disclosure, by placing a ball bearing 200 between each of the pumps 300 and the wobble plate 400, at least one additional degree of freedom is created and the ball bearings 200 create a rolling contact between the pumps and the wobble plate 400, which greatly improves the efficiency of the hydraulic system, especially at the high rotational speeds of the motor 30. As shown, each ball bearing has two contact points. There is a contact point 650A between the ball bearing 200 and the pump 300, and a contact point 650B between the ball bearing and the wobble plate 400. As the wobble plate 400 moves through its cycle, a line connecting the contact points on the ball bearing 200 changes in a conical pattern 600 (see FIG. 26 depicting the conical pattern for illustrative purposes). The end result of this configuration is an improved and more efficient operation of the hydraulic system and thus the tool 10.

The foregoing embodiments and advantages are merely exemplary and are not to be construed as limiting the scope of the present invention. The description of an exemplary embodiment of the present invention is intended to be illustrative, and not to limit the scope of the present inven-

What is claimed is:

1. A jaw assembly for an in-line hydraulic tool, the jaw assembly comprising:
   a first jaw member having a distal end portion and a proximal end portion, wherein the distal end portion of the first jaw member defines a first portion of a working area of the in-line hydraulic tool, and wherein the proximal end portion of the first jaw member includes at least one yoke coupling member extending from at least one side of the first jaw member and configured to mate with a first yoke coupling member on a yoke of the in-line hydraulic tool;
   a second jaw member having a distal end portion and a proximal end portion, wherein the distal end portion of the second jaw member defines a second portion of the working area of the in-line hydraulic tool, and wherein the proximal end portion of the second jaw member includes at least one yoke coupling member extending from at least one side of the second jaw member and configured to mate with a second yoke coupling member on the yoke of the of the in-line hydraulic tool;
   an interlocking mechanism associated with the first and second jaw members such that the first jaw member and the second jaw member can pivot relative to each other; and
   a locking pin that can extend through the interlocking mechanism to facilitate releasably attaching the first jaw member and the second jaw member to the yoke of the in-line hydraulic cutting tool when installed;
   wherein when the yoke coupling member of the first jaw member is mated with the first yoke coupling member the first jaw member is coupled to the yoke of the in-line hydraulic tool, and when the yoke coupling member of the second jaw member is mated with the second yoke coupling member the second jaw member is coupled to the yoke of the in-line hydraulic tool such that the first and second jaw members are prevented from falling out of the yoke when the locking pin is removed from the interlocking mechanism.

2. The jaw assembly according to claim 1, wherein the yoke coupling member of the first jaw member comprises a raised tab and the first yoke coupling member comprises a tab notch.

3. The jaw assembly according to claim 2, wherein the raised tab is mated with the tab notch by inserting the raised tab into the tab notch.

4. The jaw assembly according to claim 1, wherein the yoke coupling member of the second jaw member comprises a raised tab and the second yoke coupling member comprises a tab notch.

5. The jaw assembly according to claim 4, wherein the raised tab is mated with the tab notch by inserting the raised tab into the tab notch.

6. The jaw assembly according to claim 1, wherein the interlocking mechanism comprises:
   a tang having a bore therethrough positioned between the distal end portion and the proximal end portion of the first jaw member;
   a clevis having a bore therethrough positioned between the distal end portion and the proximal end portion of the second jaw member; and
   wherein the clevis is capable of receiving the tang such that the bore through the clevis can align with the bore through the tang.

7. The jaw assembly according to claim 6, wherein the interlocking mechanism further comprises a sleeve inserted through the bore in the clevis and the bore in the tang such that the first jaw member and second jaw member can pivot relative to each other.

8. A jaw assembly for an in-line hydraulic tool, the jaw assembly comprising:
   a first jaw member having a distal end portion, a proximal end portion and a tang positioned between the distal end portion and the proximal end portion, wherein the distal end portion of the first jaw member defines a first portion of a working area of the in-line hydraulic tool, wherein the tang includes a bore therethrough, and wherein the proximal end portion of the first jaw member includes at least one yoke coupling member extending from at least one side of the first jaw member and configured to mate with a first yoke coupling member on a yoke of the in-line hydraulic tool;
   a second jaw member having a distal end portion, a proximal end portion and a clevis positioned between the distal end portion and the proximal end portion, wherein the distal end portion of the second jaw member defines a second portion of the working area of the in-line hydraulic tool, wherein the clevis includes a bore therethrough and is capable of receiving the tang of the first jaw member such that the bore through the clevis can align with the bore in the tang, and wherein the proximal end portion of the second jaw member includes at least one yoke coupling member extending from at least one side of the second jaw member and configured to mate with a second yoke coupling member on the yoke of the of the in-line hydraulic tool;
   a sleeve inserted through the tang and clevis bores such that the first jaw member and second jaw member can pivot relative to each other; and
   a locking pin that can extend through the sleeve to facilitate releasably attaching the first jaw member and the second jaw member to the yoke of the in-line hydraulic tool when installed;
   wherein when the yoke coupling member of the first jaw member is mated with the first yoke coupling member the first jaw member is coupled to the yoke of the in-line hydraulic tool, and when the yoke coupling member of the second jaw member is mated with the second yoke coupling member the second jaw member is coupled to the yoke of the in-line hydraulic tool such that the first and second jaw members are prevented from falling out of the yoke when the locking pin is removed from the sleeve.

9. The jaw assembly according to claim 8, wherein the yoke coupling member of the first jaw member comprises a raised tab, and the first yoke coupling member comprises a tab notch.

10. The jaw assembly according to claim 9, wherein the raised tab is mated with the tab notch by inserting the raised tab into the tab notch.

11. The jaw assembly according to claim 8, wherein the yoke coupling member of the second jaw member comprises a raised tab and the second yoke coupling member comprises a tab notch.

12. The jaw assembly according to claim 11, wherein the raised tab is mated with the tab notch by inserting the raised tab into the tab notch.

13. An in-line battery-powered hydraulic tool comprising:
   a handle assembly in an in-line type shape having a hand grip portion and a neck portion, the neck portion including a yoke; and a working head assembly operatively coupled to the yoke, the working head assembly including:
  a first jaw member having a distal end portion and a proximal end portion, wherein the distal end portion of the first jaw member defines a first portion of a working area of the in-line hydraulic tool, and wherein the proximal end portion of the first jaw member includes at least one yoke coupling member extending from at least one side of the first jaw member and configured to mate with a first yoke coupling member on the yoke of the in-line hydraulic tool;
  a second jaw member having a distal end portion and a proximal end portion, wherein the distal end portion of the second jaw member defines a second portion of the working area of the in-line hydraulic tool, and wherein the proximal end portion of the second jaw member includes at least one yoke coupling member extending from at least one side of the second jaw member and configured to mate with a second yoke coupling member on the yoke of the in-line hydraulic tool;
  an interlocking mechanism associated with the first and second jaw members such that the first jaw member and the second jaw member can pivot relative to each other; and
  a locking pin that can extend through the interlocking mechanism to facilitate releasably attaching the first jaw member and the second jaw member to the yoke of the in-line hydraulic tool when installed;
  wherein when the yoke coupling member of the first jaw member is mated with the first yoke coupling member the first jaw member is coupled to the yoke of the in-line hydraulic tool, and when the yoke coupling member of the second jaw member is mated with the second yoke coupling member the second jaw member is coupled to the yoke of the in-line hydraulic tool, such that the first and second jaw members are prevented from falling out of the yoke when the locking pin is removed from the interlocking mechanism.

14. The jaw assembly according to claim 13, wherein the yoke coupling member of the first jaw member comprises a raised tab and the first yoke coupling member comprises a tab notch.

15. The jaw assembly according to claim 14, wherein the raised tab is mated with the tab notch by inserting the raised tab into the tab notch.

16. The jaw assembly according to claim 13, wherein the yoke coupling member of the secondt jaw member comprises a raised tab and the second yoke coupling member comprises a tab notch.

17. The jaw assembly according to claim 16, wherein the raised tab is mated with the tab notch by inserting the raised tab into the tab notch.

18. The jaw assembly according to claim 13, wherein the interlocking mechanism comprises:
  a tang having a bore therethrough positioned between the distal end portion and the proximal end portion of the first jaw member;
  a clevis having a bore therethrough positioned between the distal end portion and the proximal end portion of the second jaw member; and
  wherein the clevis is capable of receiving the tang such that the bore through the clevis can align with the bore through the tang.

19. The jaw assembly according to claim 18, wherein the interlocking mechanism further comprises a sleeve inserted through the bore in the clevis and the bore in the tang such that the first jaw member and second jaw member can pivot relative to each other.

* * * * *